Patented Jan. 18, 1949

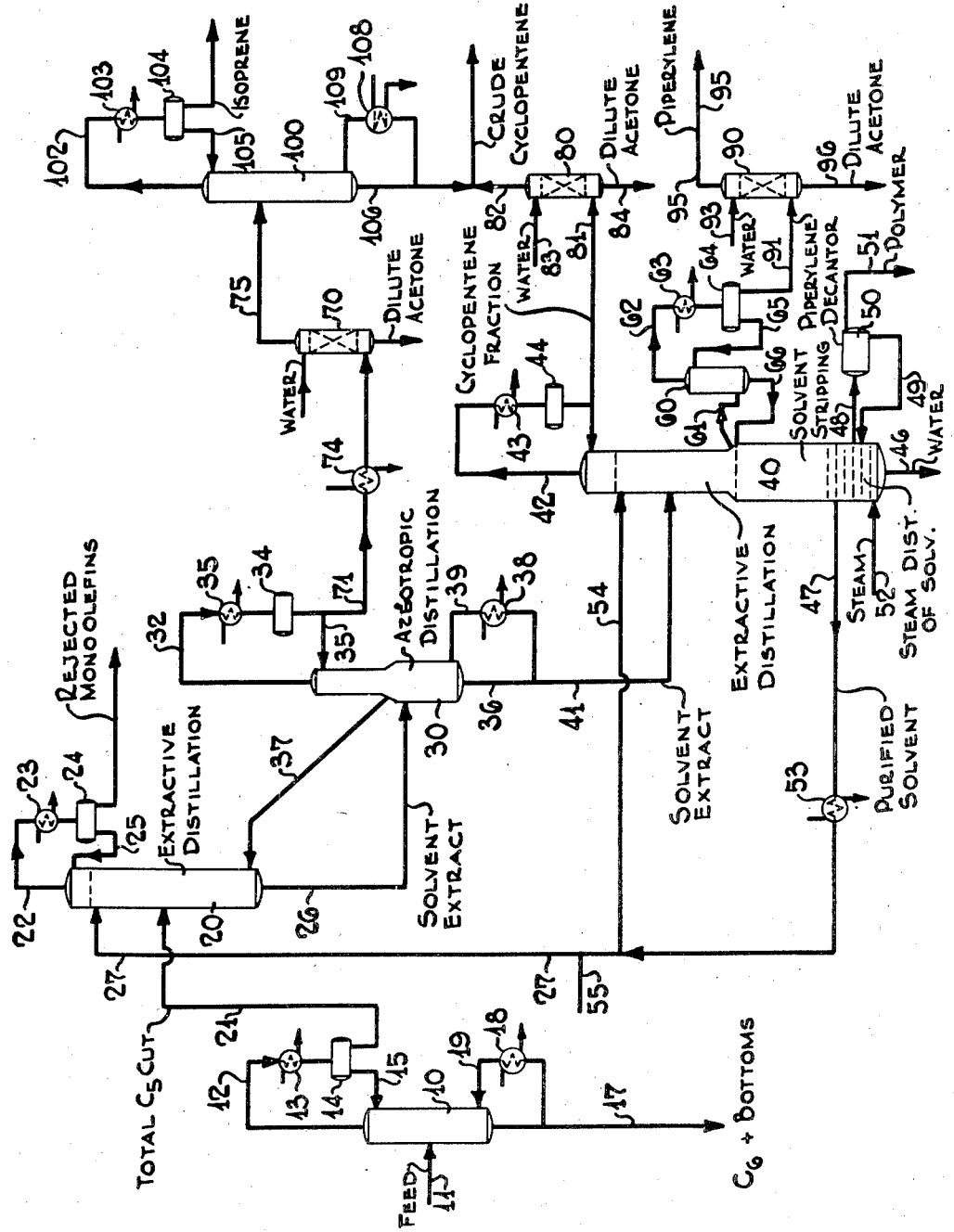

2,459,403

UNITED STATES PATENT OFFICE 2,459,403

SEGREGATION OF C$_5$ HYDROCARBONS BY EXTRACTIVE AND AZEOTROPIC DISTILLATION

George L. Ahrens, Scotch Plains, N. J., assignor to Standard Oil Development Company, a corporation of Delaware Application July 20, 1944, Serial No. 545,814

2 Claims. (Cl. 202—39.5)

This invention relates to the separation of two closely related hydrocarbons from complex mixtures containing same, and in particular to the separation of two closely related diolefins such as isoprene and piperylene, in high degrees of purity from hydrocarbon mixtures.

It is an object of the invention to effect the separation in high degrees of purity of two closely related hydrocarbons by a process involving as steps normal distillation, extractive distillations, and an azeotropic distillation so integrated and novel as to involve improved processing features particularly as to economies in the use of the solvent and heat supplies.

Another object of the invention is to effect the removal of polymers from the single solvent employed in the extractive and azeotropic distillation steps, so as to reduce solvent recovery steps in the overall processing.

A further object of the invention is to insure, when water-containing solvents are used in the extractive and azeotropic distillation steps, a relatively uniform water content of the solvents during processing.

Other objects will be apparent from the description and illustration of the invention.

Fractional distillation alone as a means of separating from complex mixtures of similar and closely boiling hydrocarbons, the individual compounds in any degree of purity is generally considered beyond commercial realization. This is clearly evident from the following tabulation of the boiling points of various C$_5$ hydrocarbons and the relative volatilities of these hydrocarbons with respect to isoprene and transpiperylene as standards:

| | Normal B. P. | Normal Relative Volatility ("alpha")[1] @ 25 p. s. i. g. | |
|---|---|---|---|
| | °C. | | |
| 3-methyl butene-1 | 21.2 | 1.52 | |
| Penetene-1 | 30.2 | 1.10 | |
| 2-methyl butene-1 | 31.1 | 1.03 | |
| Isoprene | 34.1 | 1.00 | 1.30 |
| T-pentene-2 | 35.9 | 0.93 | |
| n-pentane | 36.0 | 0.92 | |
| Cis-pentene-2 | 37.0 | 0.91 | |
| Trimethylethylene (2-methyl butene-2) | 38.4 | 0.88 | 1.14 |
| Cyclopentadiene | 41.0 | 0.83 | 1.08 |
| T-piperylene | 41.9 | 0.77 | 1.00 |
| Cis-Piperylene | 43.9 | 0.75 | |
| Cyclopentene | 44.1 | 0.73 | 0.95 |
| Cyclopentane | 49.5 | 0.69 | |

[1] Relative volatility is designated by "alpha"; Alpha A:B = $\frac{\text{Fugacity. A}}{\text{Fugacity. B}}$ at constant pressure.

A different basis of separation of the compounds is furnished by the employment of certain liquids in extractive and azeotropic distillation systems. The separation in these cases depends not only upon volatility but also upon the extent of unsaturation and the structure of the molecular entities. As shown in the art, liquids suitable in such type distillations are in general stable organic liquids of high di-electric constant. Suitable liquids have in general the following characteristics:

(1) High solubility for the hydrocarbons
(2) Marked effect on the relative volatility
(3) Readily separable from the hydrocarbons by distillation or when azeotropes are formed, by solvent extraction or other means
(4) Sufficient volatility to permit stripping without requiring the use of high temperatures
(5) Non-corrosiveness and comparative stability when heated in the presence of hydrocarbons
(6) Commercial availability.

In the case of processing according to the present invention, the solvent particularly advantageous is aqueous acetone.

Illustration of the advantageous use of such polar liquids is afforded by the comparison of the relative normal volatilities of the C$_5$ hydrocarbons as previously given and the relative volatilities in the presence of acetone in excess and in azeotropic combinations.

| | "Alpha" in presence of 2 vols. aqueous acetone at 25 p. s. i. g. | "Alpha" of Ternary Azeotropes— Hydrocarbon, Acetone, Water | |
|---|---|---|---|
| 3-methyl butene-1 | 1.59 | | |
| Pentene-1 | 1.53 | | |
| 2-methyl butene-1 | 1.49 | | |
| n-pentane | 1.43 | | |
| t-pentene-2 | 1.30 | | |
| Cis-pentene-2 | 1.28 | | |
| Trimethylethylene (2-methyl butene-2) | 1.26 | 1.64 | |
| Isoprene | 1.00 | 1.30 | 1.00 | 1.33 |
| Cyclopentane | 0.97 | 1.26 | | |
| Cyclopentene | 0.95 | 1.23 | 0.84 | 1.12 |
| Cyclopentadiene | 0.82 | 1.06 | 0.96 | 1.28 |
| T-piperylene | 0.77 | 1.00 | 0.75 | 1.00 |
| Cis-piperylene | 0.75 | .97 | 0.72 | .96 |

These differences in relative volatilities of the various compounds in the presence and absence of the polar liquid can be utilized advantageously to effect the separation of individual hydrocarbons in a high degree of purity only by certain combinations of the various distillation systems so that progressive elimination of the undesirable compounds can be made. The present invention is concerned with a particular combination of fractional, extractive and azeotropic distillation systems so that two closely related hydrocarbons, such as isoprene and piperylene, can be separated in high degrees of purity from a distillate containing a complex mixture of C$_5$ hydrocarbons.

The separation of the commercially important diolefins, isoprene and transpiperylene, from hydrocarbon mixtures by combination of normal and solvent distillation systems with aqueous acetone as the solvent has been previously proposed in the art. Extractive distillations with aqueous acetone have been made in the prior art employing a ratio of 2 to 2.5 volumes of solvent to one volume of hydrocarbon in the liquid phase. In order to maintain this desirable solvent hydrocarbon ratio, solvent is added continuously near the top of the extraction tower. The solvent flows to the base of the tower, where after stripping out the hydrocarbons comprising the bottoms hydrocarbon, it is withdrawn for recirculation to the top of the extractive distillation section. The bottoms hydrocarbons fraction containing the diolefin is removed as a vapor sidestream which enters a stripping column to fractionate out the solvent.

Complete removal of the diolefin fraction from the solvent before the latter is recirculated is usually necessary since any hydrocarbons returned to the top section of the extractive system would tend to be lost with the hydrocarbons rejected overhead. In order to strip out the diolefin hydrocarbons from the solvent a high reflux ratio with 20 to 30 fractionating plates is therefore usually considered necessary for the removal of such diolefins from the solvent mixture.

In such stepwise processing, to effect a high recovery and purification of each of two diolefins such as isoprene and piperylene from a complex hydrocarbon mixture, two extractive distillation systems are required. Each such extractive distillation system when conducted independently requires its own solvent stripping equipment and the solvent recirculation is the sum of the solvent requirements of the extractive distillation system for isoprene and the extractive distillation system for piperylene.

It has now been found that the combination of the various individual processing steps required for the separation and purification of such diolefins as isoprene and piperylene can be integrated so as to effect an overall improvement in processing. In this integration the solvent extract from the first of the two extractive distillations is subjected to an azeotropic distillation and the excess solvent thereby obtained passed without purification to the second extractive distillation system. The solvent from the second extractive distillation is stripped of the hydrocarbons in the extract by the conventional method and recirculated as fresh solvent to the first extractive distillation system. This is essentially the basis of the present invention.

Processing according to the invention involves a fractional distillation being first made upon the feed stock so as to obtain the desired hydrocarbons in as high a concentration as can be effected by simple distillation. The distillate is then subjected to extractive distillation in the presence of aqueous acetone as solvent in the ratio of between 2 or 3 volumes of solvent to one of hydrocarbon in order to remove the noncyclic monoolefins as overhead while leaving as distillation residue solvent containing isoprene, piperylene and cyclopentene in high concentrations. This distillation residue is subjected to an azeotropic distillation to effect a separation between isoprene and piperylene; the azeotrope of isoprene and aqueous acetone, together with some cyclopentene, being distilled overhead while the piperylene and some cyclopentene is withheld in the solvent as the distillation residue.

The overhead fraction from the azeotropic distillation is washed with water and the product fractionally distilled in order to obtain relatively pure isoprene while the distillation residue is subjected to an extractive distillation in order to obtain the cyclopentene in the overhead fraction and to retain the piperylene in the solvent as distillation residue. The piperylene fraction is stripped from the solvent in the lower part of the distillation column, removed as a side stream and the piperylene recovered after water washing. The stripped solvent is withdrawn from the base of the distillation column, a minor portion being recycled to the top of the tower while the major portion is passed to the extractive distillation column effecting the initial separation in the processing of isoprene and piperylene from the monoolefins.

It has been found advantageous to return the water layer which forms upon condensation of the azeotropes with the reflux to the tower. This feature aids in maintaining a more uniform and constant water content of the solvent in the system and assists in separating the azeotropes from the main body of the solvent. Also extraneous water as liquid or steam may be added in the solvent stripping steps as a means of effecting more easily the separation of the hydrocarbons from the solvent before the latter is recirculated; the added water being removed from the stripper solvent by continuous distillation of part of same.

As a particular feature of the invention, the solvent required for the extractive distillation of the piperylene fraction is supplied for the most part with the feed to the column from the previous processing stages. Additional solvent is added near the top of the extractive distillation column in order to obtain the desired ratio of solvent to hydrocarbon above the feed plate. The solvent is withdrawn from the base of the column and the major portion thereof is passed to the extractive distillation column, effecting the initial separation in the processing of isoprene and piperylene from the monoolefins, while a minor portion is recirculated directly to the top section of the second extractive distillation column.

Thus, according to the invention, the total circulation of the solvent in the processing is reduced when compared with normal processing to the extent that the solvent requirements of the second extractive distillation are supplied from the first extractive distillation system. This reduction in solvent circulation is a desirable processing feature in order to minimize solvent losses from packing glands. Furthermore, the lower recirculation rate has the advantage of reducing the heat exchange equipment and the potential loss or rejection of heat from the system. Due to the temperatures at which the various distillations are effected and the comparatively long residence time of the diolefins in the extractive distillation system, polymerization usually occurs. This polymer formation causes an undesirably high boiling content in the solvent which if not removed, will cause fouling of the equipment. In order to keep the polymer concentration at a low level, it has been disclosed in the prior art to withdraw continuously a portion of the solvent from the system for removal of the polymer. It is a second processing feature of the invention that the removal of such polymer can be effected during normal processing.

In processing according to the invention, a large portion of the solvent downflow at the base of the solvent stripper is subjected to a steam distillation in a short column directly connected as an extension to the normal solvent stripper immediately below the point of solvent draw-off for recirculation. In the steam distillation column the polymers which are higher boiling than acetone and insoluble in water concentrate as an oily layer over the dilute acetone or water in the lower portion of the column. The oily layer is removed by decantation. Any heavy oil which will not settle out but remains dispersed in the total liquid will be removed with the water draw-off from the base of the column. The steam injected at the base of the steam distillation column supplies the total heat requirements of the extractive distillation.

The advantages of being able to withdraw the polymer as a feature of processing are:

(1) It eliminates the reboiler heat exchange surface which normally tends to foul up with use;

(2) It eliminates the cost of purifying the solvent in auxiliary equipment when withdrawing the solvent from the system as occurs in the prior art;

(3) The equipment is simplified; and (4) The normal polymer content of the circulated solvent will be reduced since a greater portion of the solvent is subjected to purification in the steam stripper (approximately 50%) than in the case of 5 to 10% solvent withdrawal as occurs in prior art procedures.

In order to present a fuller understanding of the invention, processing according to the invention in a particular case will be described and further displayed in the drawing, Fig. 1. As feed supply a typical debutanized distillate stream obtained from the liquid phase cracking of a virgin gas oil stock may be taken. Such fraction boiling from 90° F. to 400° F. and of the following composition may be taken:

| | Arom. Dist. Mol. Per Cent | C₅ Fraction Mol. Per Cent |
|---|---|---|
| Butanes | 0.5 | 1.8 |
| 3-methylbutene-1 | 0.5 | 1.8 |
| Pentene-1 | 9.4 | 33.7 |
| 2-methylbutene-1 | 2.0 | 7.2 |
| Isoprene | 4.1 | 14.7 |
| Trans-pentene-2 | 1.0 | 3.6 |
| Normal Pentane | 0.8 | 2.9 |
| Cis-Pentene-2 | 1.0 | 3.6 |
| Trimethylethylene (2-methylbut.-2) | 2.2 | 7.9 |
| Cyclopentadiene | 1.3 | 4.6 |
| Transpiperylene | 2.7 | 9.7 |
| Cis-piperylene | 0.2 | 0.7 |
| Cyclopentene | 2.1 | 7.5 |
| Cyclopentane | 0.1 | 0.3 |
| C₆ Aliphatics | 11.7 | |
| C₆ Aromatics | 11.7 | |
| C₇ | 18.7 | |
| C₈ | 9.8 | |
| C₉ | 20.2 | |

The feed stock is supplied to fractionating equipment 10 through line 11. The fractionating equipment 10 may be any of the usual forms of fractionating devices such as a column containing bubble cap plates. The equipment is operated usually at pressures somewhat above that of the atmosphere. In the diagram equipment 10 is shown as being a tower of multi-plate construction containing bubble cap plates. In normal operation of a process according to the invention, between 30 and 50 plates are commonly employed. The tower is shown as being built with an overhead vapor line 12, a condenser 13, a drum 14, a reflux line 15, a bottoms line 16, a reboiler 18 and a reboiler vapor line 19. The distillate product is withdrawn from the distillation system through line 21 and the bottoms product in the system through line 17. The pressure upon the system for the treatment of the specific composition given is maintained at about 25 lbs. pressure per square inch (gauge) in order to allow employment of ordinary water for cooling purposes in the condenser 13. The degree of separation in tower 10 is controlled by the heat supplied from the reboiler and the ratio of the reflux supplied through line 15. The reflux ratio is maintained between 1 and 2.

The percentage of feed taken as product through line 21 is adjusted so as to remove the major portion of the isoprene and transpiperylene in this fraction, while rejecting in the residue higher boiling hydrocarbons of the C₅ and C₉ range. Thus about 20 wt. per cent of the feed is taken as distillate material. Under these conditions the temperature at the top of the tower is usually about 140° F., while the temperature at the exit line 16 is about 300° F.

The overhead product removed through line 12 consists of a narrow C₅ fraction containing the majority of the isoprene and piperylene in the feed material. The entire distillate is condensed in equipment 13 and passed to the drum 14. From the drum 14 a quantity of reflux is passed through line 15 in order to maintain the desired operating conditions. The remainder of the condensed distillate is withdrawn from drum 14 and passed through line 21 for further processing. The ratio of reflux to product is between 1 and 2, depending on the feed stock. In the processing of the feed stock of the specific illustration, the composition of the distillate material under the particular operating conditions given shows the following analysis:

| | C₅ Fraction mol per cent |
|---|---|
| Butanes | 1.8 |
| 3-methylbutene-1 | 1.8 |
| Pentene-1 | 33.7 |
| 2-methylbutene-1 | 7.2 |
| *Isoprene* | 14.7 |
| Trans-pentene-2 | 3.6 |
| Normal pentane | 2.9 |
| Cis-pentene-2 | 3.6 |
| Trimethylethylene (2-methylbut.-2) | 7.9 |
| Cyclopentadiene | 4.6 |
| *Transpiperylene* | 9.7 |
| Cis-piperylene | 0.7 |
| Cyclopentene | 7.5 |
| Cyclopentane | 0.3 |

The residual material, consisting of C₆ and higher boiling hydrocarbons is withdrawn through line 16. A portion of the residue is passed through the reboiler 18 where it is vaporized in order to supply the heat necessary in order to operate the tower, the vapor being returned to the tower 10 through line 19. The remainder of the higher boiling material is removed from the system through line 17.

The overhead fraction from tower 10 as removed through line 21 is passed to the fractionating tower 20. The tower 20 is similar in design to tower 10 and may be any type of suitable fractionating equipment, preferably a bubble cap tower containing about 70 plates. It is furnished with an overhead vapor line 22, a condenser 23, a drum 24, a reflux line 25 and a bottoms lines 26. The tower has also a solvent supply line 27. The overhead fraction removed from the system through line 22 is condensed in equipment 23 and collected in drum 24. A portion of the condensate is employed as reflux through line 25, while the remainder is passed to distillation equipment, not shown, for recovery of the solvent and the hydrocarbon contents as considered commercially necessary. The isoprene-piperylene rich product is withdrawn as bottoms with the solvent through line 26 and passed to tower 30. Heat for the operation of the column is supplied by vapors from column 30 by means of line 37.

In tower 30 which is similar in design to towers 10 and 20, the isoprene rich solvent mixture is subjected to azeotropic distillation. The tower 30 is similar in design to towers 10 and 20 and may be any type of suitable fractionating equipment, preferably a bubble cap tower containing about 30 plates. It is furnished with an overhead vapor line 32, a condenser 33, a drum 34, a reflux line 35, a bottoms line 36, a reboiler 38 and a reboiler vapor line 39. The tower has also a solvent recycle vapor line 37 from above the feed plate which supplies heat to column 20. The pressure upon the system is maintained at about 25 lbs. per square inch (gauge) in order to have a workable condensing temperature similar to that employed in fractionating equipment 10.

The overhead distillate vapor removed through line 32 consists largely of the azeotrope of isoprene and solvent. It is condensed in equipment 33 and passed to drum 34. A portion of the condensate is returned to the tower through line 35 as reflux, while the remainder being withdrawn through line 71 and through cooler 74 to the tower 70. In the tower 70, the cooled isoprene rich mixture is countercurrently treated with water. The tower 70 may be any suitable type of liquid liquid contacting device in which countercurrent flow of materials may be obtained. In the present case the tower is packed with Raschig rings and sufficient pressure is maintained in the tower to prevent a vaporization of any of the materials passing through the tower. The solution admitted through line 71 is introduced into the tower near the bottom and passed upward through the tower countercurrently to the stream of water introduced near the top through line 73. In passing through the tower the solvent is extracted from the hydrocarbon material. The quantity of water employed in the tower is determined by the partition of the solvent between the hydrocarbon and water and the efficiency of the contacting devices in the tower. For the specific composition of this illustration, a volume ratio of water to combine solution of approximately 1 is maintained. The hydrocarbons free of solvent are removed through line 75 at the top of the tower and passed to fractionating equipment 100.

The tower 100 is similar in design to towers 10, 20 and 30 and may be any type of suitable fractionating equipment and preferably a bubble cap tower containing 50 plates. It is furnished with an overhead vapor line 102, a condenser 103, a drum 104, a reflux line 105, a bottoms line 106, a reboiler 108 and a reboiler vapor line 109. The bottoms product is removed from the system through line 107. The pressure upon the system is maintained so as to effect satisfactory condensation with ordinary water in the condenser 103. In a specific example of this illustration the pressure maintained upon the tower 100 is between 15 and 25 pounds per square inch (gauge) and a reflux ratio of about 12 is maintained.

The distillate withdrawn through line 102 consists of highly purified isoprene. The distillate is condensed in equipment 103 and the condensate conducted to the drum 104. A portion of the condensate is returned to tower 100 through line 105. The remainder of the condensate is withdrawn as product through line 114, and transferred to storage. The bottoms from the tower 100 consisting of cyclopentadiene and cyclopentene, in addition to any polymer or other high boiling constituents of the feed to the tower and containing only traces of isoprene, are withdrawn through line 106. A portion of the material is passed through the reboiler 108 where it is vaporized, the vapors being returned to the tower 100 through line 109 to supply the heat necessary to operate the tower. The remainder of the bottoms are removed through line 107 and passed to storage as a source for cyclopentene. The distillation residue obtained from the azeotropic distillation system 30 removed through line 36 is supplied through line 41 to about the center of the tower 40. The tower 40 is similar to towers 10, 20 and 30 in being any form of suitable distillation equipment, but preferably is a bubble cap plate tower containing 50 plates. It is furnished with an overhead vapor line 42, a condenser 43, a drum 44, a reflux line 45, a solvent inlet line 54, a bottoms line 46 and steam injection line 52. The tower has also a side stream line 61 and a return line 66 in addition to a solvent removal line 47. A sidestream line 48 passes to decanter 50 which is furnished with a drawoff line 51 and a liquid return line 49 to the column.

As overhead from the tower 40 through line 42, azeotropic mixtures containing mainly cyclopentene are obtained. This material is condensed in equipment 43 and passed to drum 44. A portion of the cooled stock is refluxed to the tower through line 45. The remainder of the condensate is passed through line 81 to liquid liquid contacting tower 80, similar in design to tower 70. In this tower the solvent is removed by countercurrent treatment with water passed through line 83. Through line 82 the hydrocarbon, mainly cyclopentene, is obtained and joins in storage the crude cyclopentene obtained as bottoms from tower 100 emitted through line 107. The bottoms from the tower 80 are passed through line 84 to a solvent recovery system.

As the main product from the tower, the side stream passes through the vapor line 61. This stream, containing largely the azeotrope of transpiperylene with aqueous acetone and acetone is passed to the tower 60 where the excess acetone is stripped out. Tower 60 is similar in design to tower 100. It is equipped with an overhead line 62, condensing equipment 63, a drum 64, a reflux line 65, a bottoms line 66. As overhead from the tower 60 the azeotrope of transpiperylene is passed to the condenser 63 and collected in drum 64. A portion of the condensate is returned as reflux to the tower 60 through line 65. The remainder is passed through line 91 to the tower 90.

The section of column 40 below the sidestream product withdrawal line 61 is operated under conditions to strip out the hydrocarbons from the solvent. The hydrocarbon free solvent is withdrawn through line 47 and is cooled by passing through cooler 53. A portion of the cooled solvent passes through line 54 as solvent supply for the top section of tower 40, while the remainder passes through line 27 as the solvent supply for the tower 20. A T connection 55 upon the line 27 is the means by which fresh solvent is added to the system.

Below the solvent withdrawal line 47, a portion of the total liquid solvent downflow in tower 40 is subjected to a steam distillation. The steam is added through line 52 and supplies the total heat requirement for the operation of the extractive distillation 40 and sidestream column 60. Water is withdrawn through bottoms line 46, while solvent vapors leave the steam distillation section and enter the solvent stripping section at the plate from which solvent is withdrawn through line 47. As the liquid becomes more dilute in acetone at the base of the column, the water insoluble polymers will settle out. Line 48 is provided to pass liquid to drum 50 where the polymers are decanted and withdrawn through line 51. The dilute solvent is returned to the tower from drum 50 through line 49.

The tower 90 is a liquid liquid contacting device, to which the condensate from tower 60 is supplied near the base and flows countercurrently to a stream of water passed through line 93. The relatively pure piperylene is removed through line 95 while solvent is removed through line 96 and passed through a solvent recovery system.

What is claimed is:

1. The process of separating isoprene and transpiperylene from a debutanized refinery cracked stock of about 5 to 10% isoprene and transpiperylene content, which comprises fractionally distilling the debutanized cracked stock to separate a fraction containing the isoprene and transpiperylene in about 15 to 30% concentration, subjecting said fraction in an extractive distillation zone to an extraction distillation in the presence of a solvent having substantial effect upon the relative volatilities of the hydrocarbons present in said fraction, said solvent being aqueous acetone containing about 8% by weight of water and being used in the ratio of between about 2 and 3 parts by volume to 1 part by volume of said fraction, separating a distillation residue containing isoprene and transpiperylene of increased concentration by said extractive distillation, subjecting said residue to azeotropic distillation in which an overhead fraction stream consisting essentially of an azeotropic mixture of isoprene and solvent is obtained, redistilling a resultant residue from said azeotropic distillation in the presence of an added quantity of solvent to separate a distillate stream of transpiperylene and solvent from residual excess solvent, stripping residual hydrocarbons from said excess solvent, recycling the thus stripped solvent into the first mentioned extractive distillation zone for distilling the fraction containing isoprene and transpiperylene of about 5 to 30% concentration, and recovering the separated isoprene and transpiperylene from their respective streams.

2. The process of separating isoprene, transpiperylene and cyclopentene from a mixture thereof with non-cyclic mono-olefins in a cracked $C_5$ hydrocarbon fraction, which comprises distilling said fraction in an extractive distillation zone in the presence of an aqueous acetone solvent which increases the relative volatilities of non-cyclic mono-olefins, and leaves a residual portion of the solvent containing isoprene, transpiperylene and cyclopentene, the aqueous acetone solvent being used in a ratio of about between 2 and 3 parts by volume to 1 part by volume of the hydrocarbon fraction, azeotropically distilling from said residual solvent an azeotropic mixture of isoprene and solvent with a portion of the cyclopentene so as to leave a residue containing transpiperylene and a portion of the cyclopentene freed of isoprene in residual solvent, redistilling said residue in the presence of an added quantity of the aqueous acetone solvent to separate a distillate stream comprising essentially transpiperylene and solvent from remaining excess solvent which retains cyclopentene in solution, and stripping cyclopentene from said excess solvent.

GEORGE L. AHRENS.

REFERENCES CITED

The following references are of record in the file of this patent:

UNITED STATES PATENTS

| Number | Name | Date |
|---|---|---|
| 2,339,560 | DeSimo A. P. C. | Jan. 18, 1944 |
| 2,350,256 | Shiras | May 30, 1944 |
| 2,350,609 | Hackmuth | June 6, 1944 |
| 2,361,493 | Patterson | Oct. 31, 1944 |
| 2,407,997 | Patterson | Sept. 24, 1946 |

OTHER REFERENCES

Ser. No. 289,710, Natta (A. P. C.), published May 18, 1943.